June 26, 1956     I. W. HYND     2,751,924
AUTOMATIC TANK BATTERY AND CONTROL
Filed July 27, 1954     2 Sheets-Sheet 1
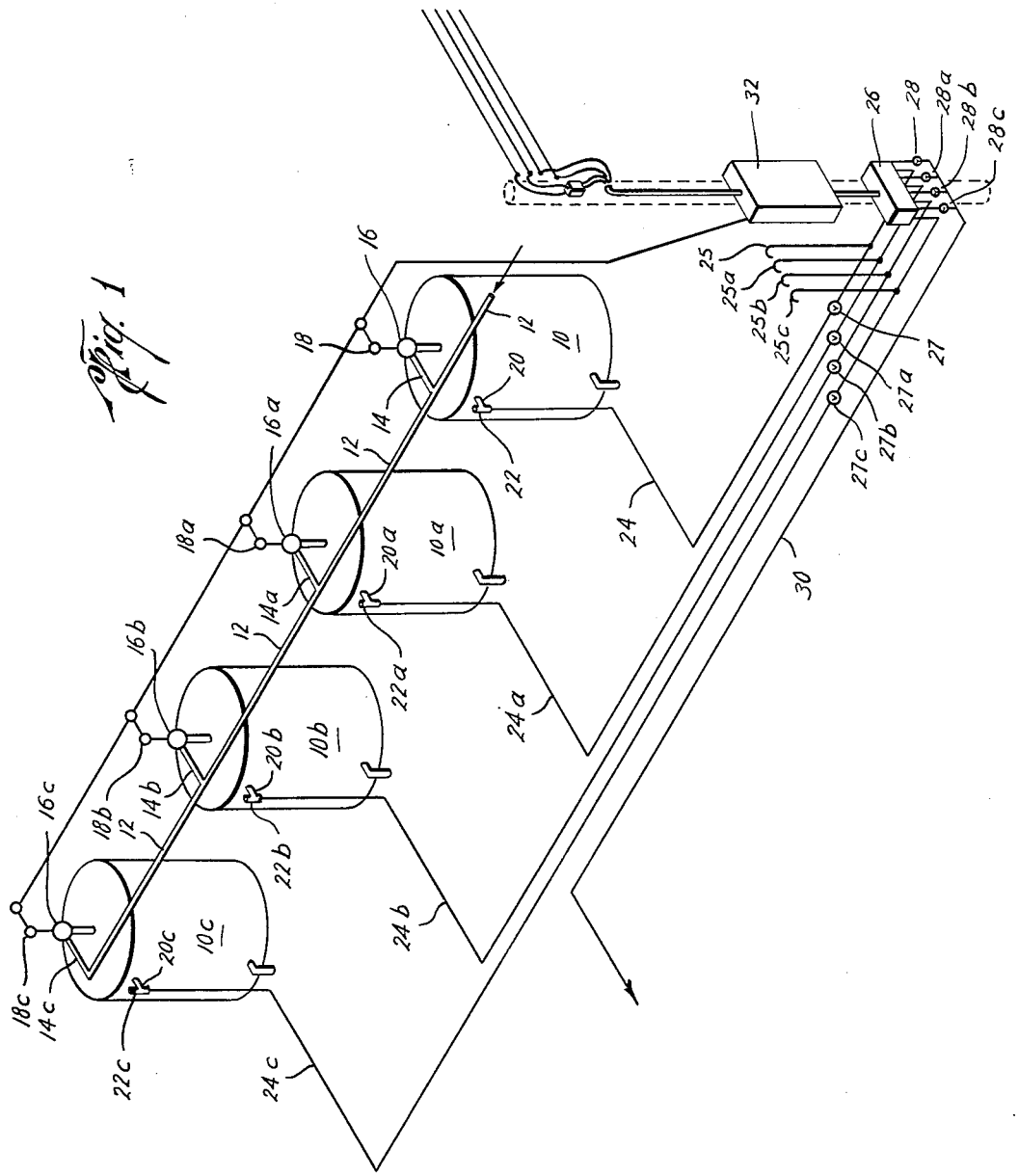
Irvin W. Hynd
INVENTOR.
BY James F. Weiler
ATTORNEY

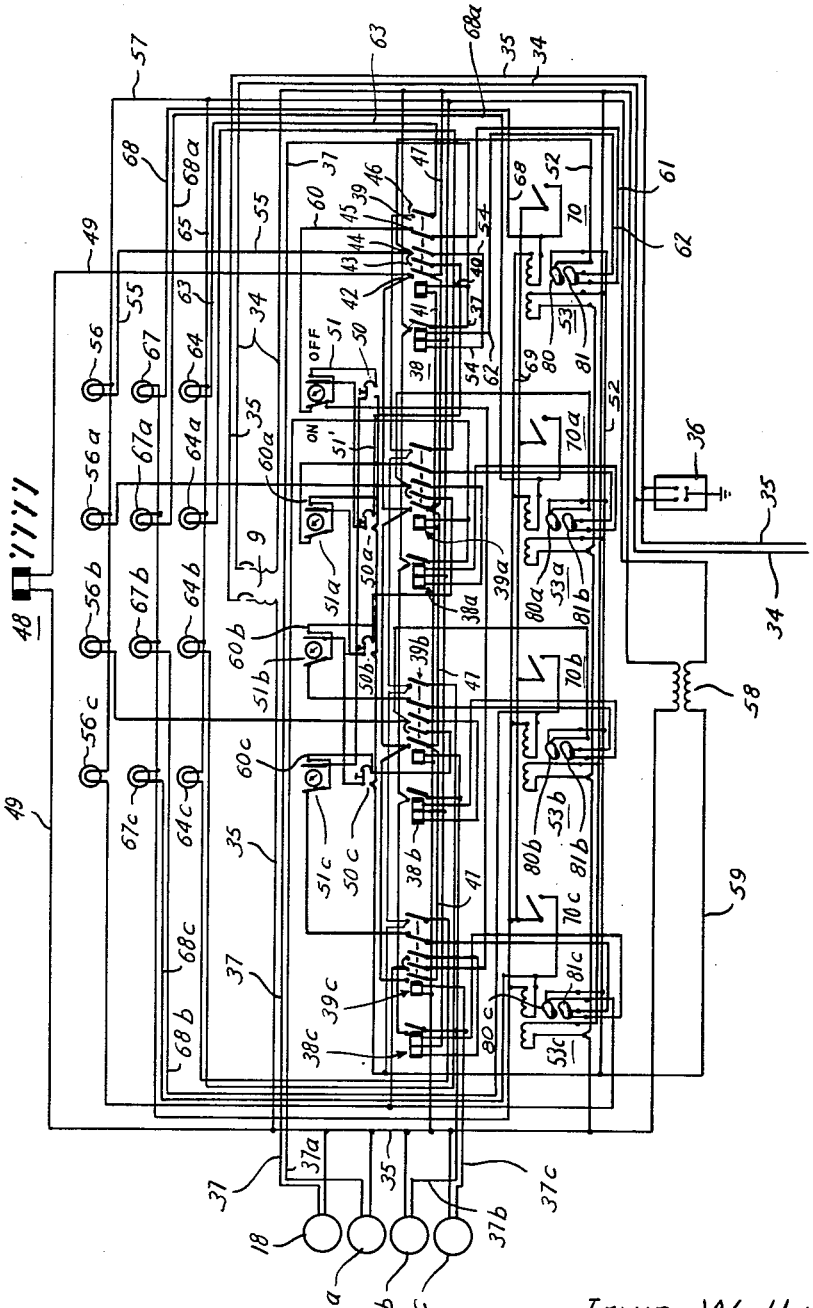

United States Patent Office

2,751,924
Patented June 26, 1956

2,751,924

AUTOMATIC TANK BATTERY AND CONTROL

Irvin W. Hynd, Midland, Tex.

Application July 27, 1954, Serial No. 446,084

13 Claims. (Cl. 137—121)

The present invention relates to an automatic tank battery and control and, more particularly, to such an automatic tank battery and control which may be used in connection with the production and storage of oil from oil wells and the like by which tanks in the battery are automatically and sequentially filled and the flow of oil to the tanks is automatically stopped when all or a selected number of the tanks are filled.

While the present invention is adapted to a wide variety of uses, for the purpose of disclosure, it is described in connection with storage of oil from oil wells and its use as a lease-well control unit, although other uses will readily be apparent to those skilled in the art.

In the production of oil from one or more oil and gas wells and the like, oil is ordinarily stored in tanks, generally a battery of tanks, and the present practice in fiilling these tanks is to operate them by hand. This entails, of course, a great deal of expense and also inefficiency due to the human element involved in manual operation and manipulation. It would be advantageous to provide means or a system by which these tanks may be filled automatically, and to include means in the system to control flow of oil to the tanks so that the flow thereto may automatically be stopped when a desired number of the tanks have been filled. It would also be advantageous to provide such a means or system which would automatically close down the wells or lease flowing oil into the tanks in the event high pressure gas is flowed inadvertently to the tanks, such as when the oil and gas separator fails.

It is therefore a general object of the present invention to provide an apparatus for automatically filling a plurality of tanks in predetermined sequence until such time as all or a desired number of tanks are filled.

It is yet a further object of the present invention to provide apparatus for automatically filling a plurality of tanks in predetermined sequence and which includes means to stops the inflow to the tanks such as by shutting in the wells or stopping the pumps.

A further object of the present invention is the provision of apparatus to restart the inflow, such as the flow of oil from wells, after a tank has been emptied and reset that particular tank and open the inlet valve thereof so that the tank may be refilled.

It is yet a further object of the present invention to provide an automatic tank battery and control of the above character which are simple and economical to construct, maintain and repair and which are reliable and efficient in operation.

It is yet a further object of the present invention to provide such an automatic tank battery and control which will close the valves on the tanks to prevent build up of excessive pressures in the tanks A further object of the present invention is the provision of a control system which includes a relay responsive to the pressure or fluid level in the tanks for sequential operation of the control system.

Another object of the present invention is the provision of an electrically-operated system for a tank battery which includes for each tank in the battery, a position relay for opening and closing the inlet valve of each tank, an associated control relay actuated by the position relay for setting up the control circuit for the operation of the position relay in sequence therewith, an associated transformer relay, the position of which is governed by actuation of a pressure-sensitive or fluid level switch for each tank which effectively and automatically provides sequential filling of the tanks.

Yet a further object of the present invention is the provision of such a system which includes a main relay controlling inflow to the battery of tanks, which main relay is connected in a circuit of each control relay so that when a particular tank is ready to be filled, flow to the tank battery is automatically permitted and, when filled, such flow is automatically stopped unless another tank in the battery is ready for filling.

Other and further objects and features will be apparent from the following description, taken in connection with the accompanying drawings, where—

Figure 1 is a perspective and diagrammatic view of a typical tank battery constructed and arranged according to the invention, and Figure 2 is a circuit diagram illustrating an electrical circuit according to the invention.

In general, the various elements associated with each tank are identical, and, accordingly, are referred to by like character references. The description will be directed to a single tank and its association with the other tanks, the letters "a," "b" and "c" being added to the numerals for like parts for each successive tank.

Referring now to the drawings, and particularly Figure 1, the reference numeral 10 indicates a typical tank of a typical tank battery for the storage of oil from oil wells and the like. These tanks may be formed of any suitable and usual material and may vary considerably. Tanks of this character are in widespread commercial use, and, accordingly, no detailed description thereof is deemed necessary.

A suitable header or a flow line 12 is provided which has a lateral 14 connected thereto and to each tank 10 by which oil is permitted to flow into each tank 10. A suitable inlet valve 16 is provided in each lateral so that flow of oil to each tank is selectively permitted. The opening and closing of each valve 16 is controlled by a valve motor or solenoid 18, as will be apparent later. Thus, each valve 16 is actuated to open and closed position by means of its associated electric valve motor or solenoid 18. These valves, valve motors or solenoids may be of any usual construction, are readily available on the market and may be purchased commercially. No detailed description thereof is deemed necessary.

Each tank 10 may be tapped at the level that the tank is to be switched, such as by a flange connection, and to each flange there may be attached a pipe T 20. A pressure relief valve, diagrammatically shown as 22, may be provided on the upper end of each pipe T 20, which may be a two ounce pressure relief valve, although others are satisfactory.

An overflow pipe 24 extends from the lower end of each pipe T 20 to a liquid level control, generally indicated in Figure 1 by the reference numeral 26 which includes a pressure-sensitive switch, as will be apparent later. Connected to each overflow pipe 24 is a bleeder valve 28 and a drain 30 is provided so that pressure in the overflow line 24 may be drained or bled off to a sediment pit and the like, as desired, for a purpose apparent later. If desired, the bleeder valves 28 may be placed in the enclosure 26 to prevent unauthorized tampering or manipulation of these valves.

An upstanding vent line 25 is provided in each overflow pipe 24 as well as a check valve 27 for the purpose of holding pressure on the transformer relay to maintain it in the desired position, as will be apparent later.

A main tank battery control, generally indicated by the reference numeral 32 is provided and, as will be apparent later, the main tank battery control comprises for each tank a bypass or selector switch, a start switch, a position relay, a control relay, a transformer relay with normally open or closed contacts in combination with a pressure-sensitive switch controlling the transformer relay or a float switch with normally open and normally closed contacts, and indicators to show when the tank is ready to fill, is filling and filled.

For a better understanding of the invention, reference may now be made to Figure 2 which illustrates a preferred electrically-operated circuit for controlling filling of the tanks. The position of all relays and switches in the circuit are shown when all tanks are empty and ready for filling. Also, the selector or bypass switches are shown in "on" position so that the tanks are filled sequentially and no tank is bypassed.

Referring now to Figure 2 a source of electrical energy is supplied to the conductors 34 and 35 having connected thereacross the lightning arrestor 36 and a manually operated input power and protective circuit breaker 9, which may be of the air type or any conventional type. The conductor 35 is connected in series to each tank valve motor or solenoid 18 and each tank motor valve 18 is connected by the conductor 37 to an electrical contact of what may be termed a position relay 38, which may be purchased on the market, such as a General Electric remote control lighting relay RR2, although any satisfactory relay of the position type may be used. The conductor 34 is connected to the other electrical contact of each position relay 38. Thus, opening and closing of each position relay 38 opens and closes a circuit which energizes the valve motor or olenoid 18 associated therewith, thereby opening and closing its associated valve 16 of that tank 10 to permit and stop inflow of liquid into such tank.

What may be termed a control relay 39 is associated with and actuated by each position relay 38. The coil of each control relay 39 is connected in series by each conductor 40, each conductor 37 and the conductor 41, the latter being connected to the conductor 35 to complete the circuit. Thus, when the coil of a position relay 38 is energized thereby closing its electrical contacts, the coil of its associated or companion control relay 39 is energized thereby moving its electrical contact members.

Each control relay may include five pairs of electrical contacts, indicated by the reference numerals 42–46, inclusive, looking from right to left on the drawing.

One each of the first set of electrical contacts 42 of each control relay 39 is connected to each other by the conductors 47 and 34, and to what may be termed a main control relay 48 by the conductor 49 connected to the other of the electrical contacts 42 of the control relays 39. This circuit is completed by the conductor 49 being ultimately connected to the conductor 35. Thus, closing and opening of the pair of electrical contacts 42 of each control relay 39 opens and closes a circuit by which the main control relay 48 is energized.

As illustrated, the main control relay 48 may be provided with a series of electrical contacts to which control circuits for valves of flowing wells and/or pumps for pumping wells may be connected so that inflow of oil may be permitted or stopped in header 12 to the tanks 10. Inasmuch as the control elements on the wells or the pumping units and the like of the wells form no part of the present invention, it is deemed unnecessary to describe these elements and controls inasmuch as they are conventional and the relay 48 merely provides a control for energizing and deenergizing these various control elements.

One each of the next pair of electrical contacts 43 of each control relay is connected to a contact of the starter or push button 50 by the conductor 51 in sequence therewith, and in series with a contact of the tank bypass or shutdown switch 51 associated with that push button. The push button switch is of the momentary contact type and the tank bypass or selector switch is of the maintained contact type. The other of the electrical contacts 43 is connected to one of the contacts 44 and then by the conductor 52 to the normally-open contact 80 of the movable switch elements of the transformer relay 53 associated therewith, each such contact 80 of each transformer relay 53 being connected to each other and in series with its respective contact 43 of each respective control relay 39. The function of contacts 43 is to set up the circuit to the position relay 38 in sequence therewith.

The third pair of contacts 44 of each control relay 39 is connected by the conductor 54 to the opening coil of its associated position relay 38 and by the conductor 55 to a suitable indicating element, such as the red light 56, which is connected by the conductor 57 to the secondary of the control transformer 58. The function of the third pair of contacts 44 is to set up the circuit to the opening coil of the companion position relay for opening same when the transformer relay 53 is operated by the closing of pressure switch 70.

The conductor 59 is connected from the other side of the secondary of the transformer 58 to the other contacts of each of the normally-open contacts 80 of the transformer relay 53 and to one contact of the fifth pair of contacts 46 of each of the control relays 39 and to the normally-open contact of each of the push button switches 50. The other of the normally-open contacts of the push button 50 is connected to a contact of the normally-closed push button switch 50 and through a contact of the off switch of the tank selector or bypass switch 51 and to one contact of the on switch 51, the on contact of switch 51 being in series with conductor 60 which is connected to one contact of the fourth pair of ontacts 45 of its associated control relay 39. The other contacts of the electrical contacts of the pair 45 of the control relay 39 are connected by means of the conductor 61 to one of the contacts 81 in the movable switch element of its associated transformer relay 53, the other contact 81 of such movable switch element being connected by the conductor 62 to the closing coil of its associated position relay 38. Thus, pressing the push button 50 closes the circuit through the selector switch 51, normally-closed pair of contacts 45, the normally-closed contacts 81 in the movable switch element of its associated transformer relay 53 thereby energizing the closing coil of its associated position relay 38, closing same which energizes its associated valve motor or solenoid 18 thereby opening associated valve 16, energizes its companion control relay 39 thereby opening and closing certain of the contacts and closing the circuit to the main control relay 48 so that oil is permitted to flow in that tank 10 controlled by these elements. While certain elements are described as normally-open or normally-closed, this refers to the position of these elements when a tank is ready to be filled and before filling.

The pair of electrical contacts 46 of each control relay 39 are connected by means of a conductor 63 to an indicator 64 for each tank which has its circuit completed by the conductors 65 and 57 to the control transformer 58. The other contact of the contacts 46 are connected by the conductor 59 to the other side of the control transformer 58. Thus, when a tank is filling this circuit is closed and the indicator 64 is energized. When the tank is filled or ready to be filled the indicator 64 is not energized. The indicator 64 may be an amber light which thus burns only when the tank is being filled.

Additional means may be provided to indicate when a tank is empty and ready for filling, and these may take the form of a green light 67 for each tank connected by the conductors 68 and 69 to the secondary of their respective transformer relays 53.

As mentioned previously, a pressure-sensitive switch 70 is provided in each overflow line 24, which switch controls and governs its associated transformer relay 53 by closing the secondary circuit of the transformer relay 53, which in turn is repelled by the magnetism of the primary winding which changes the position of the movable contacts 80 and 81.

The various electrical elements, of course, are all conventional, may be purchased commercially and no detail description thereof is deemed necessary.

In operation, assuming all tanks are empty and it is desired to start oil into tank 10, the starter button 50 is depressed which energizes the closing coil on position relay 38 through the normally-closed contacts 81 of the associated transformer relay 53 thereby closing the contacts of position relay 38 and closing the circuit to associated valve motor or solenoid 18 thereby opening associated valve 16 and permitting inflow of oil into the tank 10. The coil of control relay 39 is thereby energized thereby moving the movable elements of the electrical contacts 42–46, inclusive, closing the first three circuits, opening the fourth, and closing the fifth circuit. Closing the electrical contacts 42 energizes the main relay 48 which controls the valves on the flowing wells or on the pumps so that oil may be pumped or flowed from the wells into the header 12, and hence, into lateral 14 and into the tank 10, as described. Closing the pair of electrical contacts 43 energizes the associated starter button 50a for setting up the circuits on the tank in sequence for filling thereof after filling the tank 10. Closing the electrical contacts 44 sets up the circuit to the opening coil on its companion position relay 38 so that the latter may be opened when the transformer relay 53 is caused to operate by the contacts of the pressure switch 70 closing due to oil spilling in the overflow line 24, thereby increasing the pressure on pressure switch 70. The green light 67 is energized by the secondary of the transformer relay 53 and is burning when the tank is ready to fill and during filling of the tank 10. Opening the electrical contacts 45 opens the circuit through the closing coil of the companion position relay 39 so that when its opening coil is energized it will not be possible for the closing coil to be energized. When the tank 10 is filled to the level of its overflow T 20, oil will flow into the overflow line and raise the pressure on the pressure switch 70 connected to the transformer relay 53. When a predetermined pressure is reached, say two pounds of pressure, the pressure switch contacts are closed thereby causing the movable contacts 80 and 81 of the transformer relay 53 to change position, bridging the contacts 80 in the upper switch element and opening the contacts 81 in the lower switch element. This opens the circuit to the closing coil of position relay 38 and closes the circuit to the closing coil of the position relay 38a in sequence therewith and to the opening coil of its companion control relay 39 through the contacts 44 of its companion control relay 39. This opens the contacts of position relay 38 and closes the electrical contacts of position relay 38a. The opening of position relay 38 deenergizes the coil of associated control relay 39 causing movement of the switch elements to the position shown in the drawing for opening and closing their associated circuits. As mentioned previously, the vent line 25 and check valve 27 hold pressure on the pressure switch 70 connected to the transformer relay 53. This sequence of operation continues from tank to tank until all tanks are filled.

The only time it is necessary to depress a starter or push button 50 is when there is not an empty tank reset into which the oil from the wells may flow. Thus, if a condition arises where none of the tanks are emptied, they must be reset manually by bleeding off the bleeders 28 thereby relieving the pressure on the pressure switch, thereby causing the pressure switches to open which changes the position of the transformer relays 53 to the position shown on the drawing so that filling of the tanks may be commenced. Once one or more tanks have been emptied, the cycle may be started by depressing the starter or push button 50 of the particular tank emptied to open the valve on that tank and to start oil flowing from the wells as previously described.

It should be noted that the only time it is necessary to use the starter or push button 50 is when there is not an empty tank reset in sequence for the oil from the wells to flow into.

If there is an electric power failure, or the circuit breaker 9 is opened, electrical energy will not be supplied to the various relays and valve motors or solenoids, this causes all valves to close and all relays to assume the position shown on the drawings, except the position relays 38 will remain in the same position they were in at that time. This also causes the wells to be shut down due to relay 48 opening. As soon as power is restored, the same tank valve that was open when the power failed will re-open due to the position relay 38 that was closed at the time not changing position due to the power failure. Also, when power is restored the position relay that was closed will restore the companion control relay 39 and main relay 48 to the same positions they were in when the power failed or the circuit breaker 9 was opened thus permitting the wells to restart and oil to flow into that same tank 10.

As previously explained, when a particular tank is reset and ready to fill, a green light for that particular tank will burn. When the tank is filling, the green or amber lights burn. When a tank is full and switched, a red light comes on and the green and amber lights go out. Preferably, these lights may be mounted on the outside of the control box 32 so that they may readily be visible to the operator.

In the event it is desired to bypass a particular tank in the tank battery, this may be accomplished by turning the particular selector switch 51 for that particular tank to "off" position. This automatically sets up the next tank inasmuch as this closes a circuit to the next selector switch. In the event it is desired to shut the lease down, the circuit breaker 9 is moved to off position as previously explained.

Ordinarily in the production of oil or gas from oil wells, gas is entrained in the oil as it is flowed or pumped from the wells and conventionally passes through an oil and gas separator which separates the gas from the oil.

Sometimes, the gas and oil separator loses its liquid seal and gas goes through the oil line to the tanks and into the tanks causing an extremely dangerous condition. The present arrangement is particularly advantageous in that in the event there is a failure in the oil and gas separator and gas does flow in the oil lines to the tanks and passes into the tanks in appreciable quantities, the ordinary pressure relief valve not being able to handle the gas, the pressure switch will trip on the first tank which causes the tank valve for that particular tank to close, as previously explained, and switch to the next tank. If the condition still exists, gas will trip each pressure switch for each tank in succession and in their respective order thereby closing the inlet valves 16 for each tank and then open the main control relay 48 thereby shutting down the lease. As previously explained, it is necessary to bleed off pressure in the overflow lines 24 to open the pressure switches 70 so that the transformer relays 53 will assume the position shown on the drawing and depress a push button 50 to start inflow into the header 12 and the tanks 10. Thus, the present apparatus and system is well-suited to automatically shut down the tank battery and lease or wells flowing into that particular tank battery upon a build up of excessive and dangerous pressures.

While a transformer relay is presently preferred it will be understood that any control relay which has a normally-open and a normally-closed contact may be used, such as, for example, a General Electric CR2790E100A2 or CR2790E101A2 or CR2811A101A2. A satisfactory transformer relay, however, is a Mercoid Type V Transformer Relay. As a further example of other type of switches or relays which may be used, it is noted that a float switch may be used in place of the pressure switch 70, but in such event the float switch must have a mechanical lock until reset. Thus, numerous substitutions may be used although the specific elements described and illustrated are presently preferred.

While the present invention has been particularly described in connection with the storage of oil in tank batteries from oil and gas wells, it will readily be apparent to those skilled in the art that the present invention may be used widely as a control in storing various liquids and gases for a variety of purposes or as a control for various types of electrical equipment.

The present invention is, therefore, well suited to carry out the objects set forth and attain the advantages mentioned as well as others inherent therein. While a detailed description of a presently preferred embodiment of the invention has been given for the purpose of disclosure, numerous changes in details and arrangement and substitution of parts may be made within the spirit of the invention and the scope of the appended claims.

What is claimed is:

1. Apparatus for handling flowable material comprising, a plurality of tanks, supply and discharge means for supplying and discharging said material from each of said tanks, inlet and outlet valves in said supply and discharge means, respectively, an overflow line connected at a predetermined level to each of said tanks so that when said material therein reaches said level it overflows in said overflow line, pressure-responsive means connected to each said overflow line, said pressure-responsive means being actuated by said overflow of the material in each said line, and valve-control means for opening and closing each of the inlet valves in sequence, actuation of each said pressure-responsive means operating its associated valve-control means thereby opening its associated inlet valve and operating the valve-control means in sequence whereby the latter valve-control means opens its associated inlet valve on filling of the tank operated by said first-mentioned valve-control means, actuation of the pressure-responsive means of the last of said tanks to be filled not opening any of the inlet valves.

2. Apparatus for handling flowable material comprising, a plurality of tanks, supply and discharge means for supplying and discharging said material to and from each of said tanks, a main inlet valve for controlling inflow of said material to all of said tanks, a secondary inlet valve in each of said supply means, an outlet valve in each of said discharge means, an overflow line connected at a predetermined level to each of said tanks so that when said material therein reaches said level it overflows in said overflow line, pressure-responsive means connected to each said overflow line, said pressure-means being actuated by overflow of said material in each of said lines, and valve-control means for opening and closing each of said secondary inlet valves in sequence, actuation of each said pressure-responsive means operating its valve-control means thereby opening its associated secondary inlet valve and operating the valve-control means in sequence whereby the latter valve-control means opens its associated secondary inlet valve on filling of the tank operated by said first-mentioned valve-control means, actuation of the pressure-responsive means of the last of said tanks to be filled not opening any of the secondary inlet valves, each said valve-control means including means for opening and closing said main inlet valve, actuation of the first of said valve-control means opening said main inlet valve and actuation of the last of said pressure-responsive means closing said main inlet valve on filling of the last of said tanks.

3. The apparatus of claim 1 including a bleeder valve connected in each said overflow line for bleeding off fluid pressure from each said overflow line.

4. An electrically-operated system for effecting coordinated control and sequential filling of a plurality of tanks comprising, a plurality of tanks, supply and discharge means for supplying and discharging flowable material to and from each of said tanks, an overflow line connected at a predetermined level to each of said tanks so that when said material therein reaches said level it overflows in said overflow lines, inlet and outlet valves in each said supply and discharge means, respectively, a normally-open pressure-responsive switch connected to each said overflow line, said pressure-responsive switch being tripped by overflow of said material in said overflow lines, and means associated with each of said tanks for sequential opening and closing of said inlet valves for filling said tanks, said last-mentioned means comprising a transformer relay, the position of which is governed by said pressure-responsive switch, a position relay connected in a circuit of the transformer relay, said circuit being closed when its associated tank is being filled, a control relay connected to and actuated by said position relay, an electrically-actuated valve motor on each of said tanks electrically connected to and actuated by the position relay associated therewith, each said valve motor being connected to and actuating the inlet valve associated therewith for opening and closing the same, each control relay being electrically connected to the position relay in sequence therewith whereby tripping of said pressure-responsive switch in response to fluid pressure in said overflow line effects movement of its associated transformer relay thereby opening said circuit and thereby opening the said position relay and deenergizing the valve motor operated thereby which closes its associated inlet valve, the position relay in sequence with the control relay being connected in a circuit of the last-mentioned control relay whereby on closing said last-mentioned circuit said position relay connected thereto is actuated to closed position thereby energizing the valve motor associated with said last-mentioned position relay and the control relay associated therewith.

5. Electrically-operated apparatus for effecting co-ordinated control and sequentially filling a plurality of tanks comprising, a plurality of tanks, supply and discharge means for supplying and discharging flowable material to and from each of said tanks, an inlet valve and an outlet valve in each of said supply and discharge means, respectively, an overflow line connected at a predetermined level to each of said tanks so that when said material therein reaches said level it overflows in said overflow line, each said tank having associated therewith a pressure-sensitive switch connected to and actuated by fluid pressure in each overflow line, a transformer relay, the position of which is governed by said pressure switch, a position relay, a control relay provided with a plurality of pairs of electrical contacts, a valve motor connected to each said inlet valve and actuated by its associated position relay, said position relay being connected in a first circuit of the transformer relay, said transformer relay being provided with a second circuit connected to a first pair of said pairs of contacts, said first and second circuits being closed and open, respectively, when their associated tank is being filled, said control relay being connected to and actuated by its associated position relay, each said control relay including a normally-open third circuit connected to a second pair of said pairs of electrical contacts, one each of said first and second pairs of electrical contacts being connected, said position relay in sequence with said control relay being connected in said second circuit whereby overflowing of said material in a tank in the overflow line associated therewith actuates the pressure-sensitive switch associated therewith thereby changing the position of its associated transformer relay, thereby opening said first circuit and thereby the position relay connected therein and deenergizing the valve motor associated therewith for stopping flow of said material into said tank, said changing of position of the transformer relay serving to close said second circuit thereby closing said third circuit for energizing and closing the position relay in sequence therewith, opening of said position relay actuating said control relay associated therewith.

6. The apparatus of claim 5 including a main control relay for controlling flow of said material into said supply means, each of said control relays having a fourth circuit in which said main control relay is connected, each said fourth circuit being closed by said control relay when the tank associated therewith is being filled.

7. The electrically-operated apparatus of claim 5 including a starter circuit connected to each position relay and to an electrical contact of a third pair of such pairs of electrical contacts of its control relay, the other of said third pair of electrical contacts being connected to the starter circuit of the position relay in sequence therewith, said third pair of electrical contacts being open when the tank associated therewith is being filled but closed upon operation of said control relay after said tank is filled for actuating said position relay in sequence therewith.

8. The electrically-actuated apparatus of claim 5 including a selector switch for each of said tanks, said selector switch normally being maintained in opened position and connected through a fourth pair of said pairs of electrical contacts of each control relay to the normally-closed first circuit of the transformer relay associated therewith, said fourth pair of electrical contacts being open when the tank associated therewith is filling and closed when the tank is empty or filled whereby upon opening said selector switch its associated position relay is opened thereby maintaining its associated valve motor closed.

9. The electrically-actuated apparatus of claim 5 including a plurality of indicating means associated with each of said tanks for indicating when each of said tanks is ready for filling, when filling, and when filled.

10. An electrically-actuated system for effecting co-ordinated control and sequential filling of a plurality of tanks including supply and discharge means for supplying and discharging flowable material to and from each of said tanks, inlet and outlet valves in said supply and discharge means, respectively, an overflow line connected at a predetermined level to each tank, said system comprising a pressure-responsive switch adapted to be actuated by overflow of said material in said overflow line, a first relay actuated by said pressure-responsive switch, a position relay, a control relay provided with a plurality of pairs of electrical contacts, a valve motor adapted to be connected to one of said inlet valves and actuated by said position relay, said position relay being connected in a first circuit of said first relay, said first circuit being closed when its associated tank is being filled, said first relay being provided with a second circuit connected to a first pair of said pairs of electrical contacts, said second circuit being open when said associated tank is being filled, said control relay being connected to and actuated by said position relay, said control relay being provided with a normally-open third circuit connected to a second pair of said pairs of electrical contacts, one each of said first and second pairs of electrical contacts being connected, a second position relay connected in said second circuit whereby overflowing of said material in said associated tank in its said overflow line actuates the switch thereby changing the position of the first relay which opens said first circuit, said position relay and deenergizes the valve motor for stoping flow of said material into said tank, closing said second circuit and thereby closing said third circuit for energizing said second position relay.

11. The system of claim 10 including a main control relay for controlling flow of said material into said supply means, said control relay having a fourth circuit in which said main control relay is connected, said fourth circuit being closed when said tank is being filled.

12. The system of claim 10 including a starter circuit connected to said position relay for actuating same.

13. An electrically-actuated system for effecting co-ordinated control and sequential filling of a plurality of tanks including supply and discharge means for supplying and discharging material to and from each of the tanks, inlet and outlet valves in said supply and discharge means, respectively, said system comprising a switch adapted to be actuated at a predetermined level of liquid in one of said tanks, a first relay actuated by said switch, a position relay, a control relay provided with a plurality of pairs of electrical contacts, a valve motor adapted to be connected to one of said inlet valves and actuated by said position relay, said position relay being connected in a first circuit of said first relay, said first circuit being closed when its associated tank is being filled, said first relay being provided with a second circuit connected to a first pair of said pairs of electrical contacts, said second circuit being open when said associated tank is being filled, said control relay being connected to and actuated by said position relay, said control relay being provided with a normally-open third circuit connected to a second pair of said pairs of electrical contacts, one each of said first and second pairs of electrical contacts being connected, a second position relay connected in said second circuit whereby when the liquid reaches said predetermined level in its associated tank it actuates the switch thereby changing the position of the first relay which opens said first circuit, said position relay and de-energizes the valve motor for stopping flow of the liquid into said tank, closing said second circuit and thereby closing said third circuit for energizing said second position relay.

References Cited in the file of this patent

UNITED STATES PATENTS

| | | |
|---|---|---|
| 2,372,448 | Porteous | Mar. 27, 1945 |
| 2,572,621 | Hobson | Oct. 23, 1951 |
| 2,605,780 | Nance | Aug. 5, 1952 |